(12) United States Patent
Wang et al.

(10) Patent No.: US 12,264,008 B2
(45) Date of Patent: Apr. 1, 2025

(54) ROLLER SHUTTER-TYPE INTELLIGENT GARBAGE CAN HEAD

(71) Applicant: Xiamen Zhihui Ouneng Home Furnishings Co., Ltd, Xiamen (CN)

(72) Inventors: Zongbiao Wang, Xiamen (CN); Dinghui Gao, Xiamen (CN); Yuyao Zhu, Xiamen (CN)

( * ) Notice: Subject to any disclaimer, the term of this patent is extended or adjusted under 35 U.S.C. 154(b) by 0 days.

(21) Appl. No.: 18/406,129

(22) Filed: Jan. 6, 2024

(65) Prior Publication Data

US 2024/0140702 A1     May 2, 2024

Related U.S. Application Data

(63) Continuation of application No. PCT/CN2022/115712, filed on Aug. 30, 2022.

(30) Foreign Application Priority Data

Sep. 16, 2021 (CN) .......................... 202122265535.X

(51) Int. Cl.
    *B65F 1/16*         (2006.01)
(52) U.S. Cl.
    CPC .................................. *B65F 1/1638* (2013.01)
(58) Field of Classification Search
    CPC .................................................. B65F 1/1638

(Continued)

(56) References Cited

U.S. PATENT DOCUMENTS 5,295,605 A * 3/1994 Kawahito ............... A23L 3/001
                                                   220/240
6,752,476 B2 * 6/2004 Lin ........................ B65F 1/1426
                                                   312/297

(Continued)

FOREIGN PATENT DOCUMENTS

GB           2386597 A * 9/2003 ............... B60J 7/085
GB           2414376 A * 11/2005 ............... B65F 1/122

*Primary Examiner* — J. Gregory Pickett
*Assistant Examiner* — Niki M Eloshway
(74) *Attorney, Agent, or Firm* — Daniel M. Cohn; Howard M. Cohn

(57) ABSTRACT

Provided is a roller shutter-type intelligent garbage can head, including a protective shell, a mounting shell, a sensor, connecting blades and a coupler. A sliding groove is provided between the protective shell and the mounting shell; the connecting blades and a first baffle are arranged in the sliding groove in a limited manner; the sensor is provided at a front end of the protective shell of the roller shutter-type intelligent garbage can head, and a rear end of the sensor is electrically connected to a rotating motor by means of a connecting line; the sensor senses an upper end and controls the rotating motor to rotate stably so as to drive two sets of reel pipes to synchronously rotate under an action of the coupler. At this time, by means of the mesh connection between limiting recesses on the outer sides of the reel pipes and limiting blocks on the outer sides of the connecting blades, the connecting blades and the first baffle can be driven to be stably and automatically wound outside the reel pipes. In this process, the overall convenience is high, the collision between a cover and a hand in a using process can be effectively avoided, better use experience is provided, and the applicability of the device in a narrow space is improved.

1 Claim, 2 Drawing Sheets

(58) Field of Classification Search
USPC .................................................. 220/211, 350
See application file for complete search history.

(56) References Cited

U.S. PATENT DOCUMENTS

| | | | | |
|---|---|---|---|---|
| 8,348,080 | B2* | 1/2013 | Baptiste | B65F 1/1468 |
| | | | | 220/908 |
| 9,174,583 | B2* | 11/2015 | Kuhn | B60R 7/04 |
| 2002/0190615 | A1* | 12/2002 | Lin | B65F 1/1638 |
| | | | | 312/297 |
| 2007/0266637 | A1* | 11/2007 | McGowan | B65F 1/06 |
| | | | | 220/908 |
| 2008/0264942 | A1* | 10/2008 | Shek | B65F 1/1607 |
| | | | | 220/230 |
| 2010/0089920 | A1* | 4/2010 | Shek | B65F 1/1607 |
| | | | | 220/211 |
| 2013/0270274 | A1* | 10/2013 | Pizzella | B65F 1/10 |
| | | | | 220/350 |
| 2018/0134486 | A1* | 5/2018 | Parker | B65F 1/1623 |

* cited by examiner

ROLLER SHUTTER-TYPE INTELLIGENT GARBAGE CAN HEAD

TECHNICAL FIELD

The present utility model relates to the technical field of garbage cans, and in particular relates to a roller shutter-type intelligent garbage can head.

BACKGROUND

The garbage can is a container specially used for holding garbage and waste, which mainly includes two parts: a garbage can body and a garbage can head. The garbage can body is responsible for the placement and storage of garbage bags and garbage, and the garbage can head is responsible for sealing and blocking. Through the use with garbage bags, the garbage can head is widely used in people's daily life. However, the existing garbage can head is often applied with an overturning type opening cover. In the process of opening the cover, the cover collides with hands, resulting in poor use experience, and in the height position of narrow space, such as in a cabinet or under a bed, the garbage can head cannot be fully opened, accordingly, a roller shutter-type intelligent garbage can head is provided.

SUMMARY

In view of the deficiencies of the prior art, an object of the present utility model is to provide a roller shutter-type intelligent garbage can head, so as to solve the problems raised in the above-mentioned background art.

In order to achieve the above-mentioned object, the present utility model is realized by the following technical solution: a roller shutter-type intelligent garbage can head, including a protective shell, a mounting shell, a sensor, connecting blades and a coupler, where a sliding groove is provided between the protective shell and the mounting shell, the connecting blades and a first baffle are provided in the sliding groove in a limited manner, a plurality of groups of the connecting blades and the first baffle are connected in a linked manner, an upper end of the mounting shell performs limiting support on both sides of the bottom of the connecting blade and the first baffle via a support frame, a winding groove is provided at a rear end of the mounting shell, a winding pipe is mounted on both sides of the winding groove in a limited manner, a rotating motor is nested in the winding pipe, and the winding pipe and the rotating motor constitute a rotation structure; the winding pipe forms a winding structure with the connecting blade and the first baffle via the rotating motor.

As a preferred embodiment of the present utility model, an interior of the protective shell is positioned and mounted with the mounting shell via a threaded hole position.

As a preferred embodiment of the present utility model, an outer side of the winding pipe is in meshing connection with both the connecting blade and the first baffle via the limiting groove and the limiting block.

As a preferred embodiment of the present utility model, a plurality of groups of clamping blocks for engaging the coupler are provided on the inner sides of the winding pipes, and the two groups of winding pipes constitute a synchronous transmission via the coupler.

As a preferred embodiment of the present utility model, a front end of the protective shell is provided with a sensor, and the sensor is electrically connected to the rotating electric motor via a connecting line.

Advantageous effects of the utility model are as follows: the roller shutter-type intelligent garbage can head provided by the present utility model includes a protective shell, a mounting shell, a sliding groove, a sensor, connecting blades, a first baffle, a support frame, a winding groove, a limiting groove, a winding pipe, a coupler, a rotating motor, a limiting block, a connecting line, and a clamping block.

The roller shutter-type intelligent garbage can head integrally includes a protective shell and a mounting shell, and is located and mounted inside the protective shell and the mounting shell via a threaded hole position, with a smooth surface and beautiful appearance; moreover, on the inner side of the protective shell and the mounting shell, a plurality of groups of connecting blades and a first baffle are mounted via a sliding groove limit, and the sensor is provided at a front end of the protective shell of the roller shutter-type intelligent garbage can head, and in using the device, a rear end of the sensor is electrically connected to a rotating motor by means of a connecting line; the sensor senses the upper end and controls the rotating motor to rotate stably so as to drive two sets of reel pipes to synchronously rotate under an action of the coupler. At this time, by means of the mesh connection between limiting recesses on the outer sides of the reel pipes and limiting blocks on the outer sides of the connecting blades, the connecting blades and the first baffle can be driven to be stably and automatically wound outside the reel pipes. In this process, the overall convenience is high, the collision between a cover and a hand in the using process can be effectively avoided, better use experience is provided, and the applicability of the device in a narrow space is improved.

In the figures: 1. protective shell; 2. mounting shell; 3. sliding groove; 4. sensor; 5. connecting blade; 6. first baffle; 7. support frame; 8. winding groove; 9. limiting groove; 10. winding pipe; 11. coupler; 12. rotating motor; 13. limiting block; 14. connecting line; 15. clamping block.

DETAILED DESCRIPTION

In order to make the technical means, creative features, objects and effects achieved by the present utility model easy to understand, the present utility model is further described below in combination with detailed description.

Figure 1:
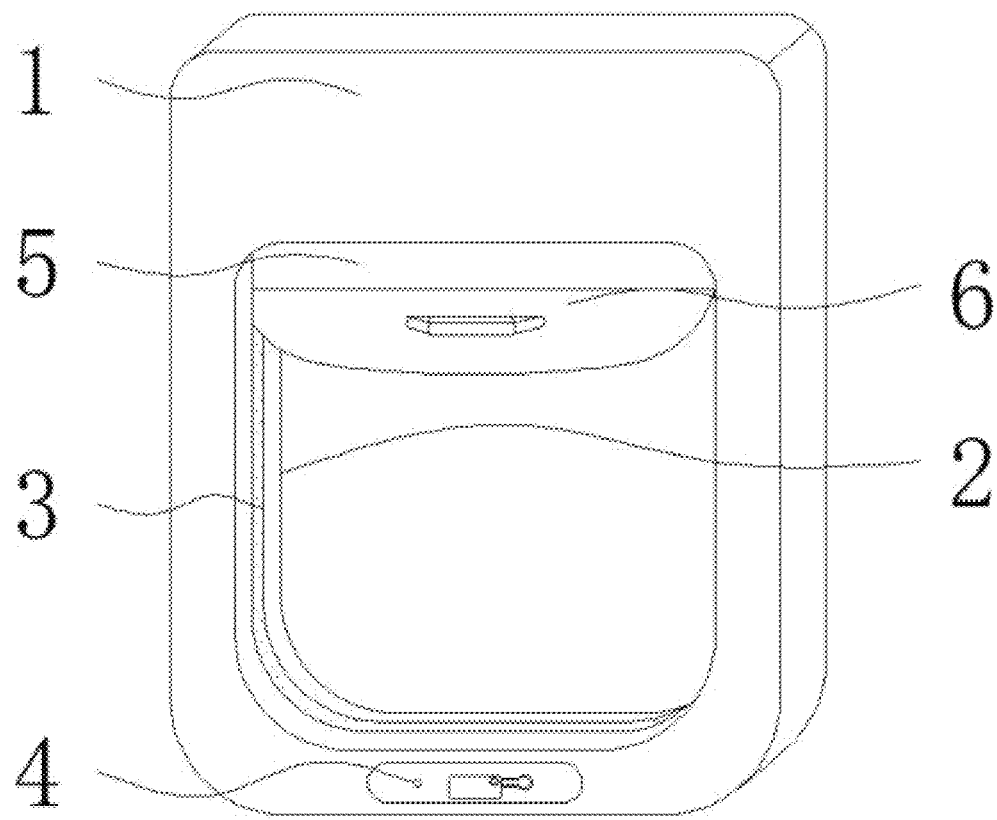
FIG. 1 is a schematic diagram of a main appearance structure of a roller shutter-type intelligent garbage can head according to the present utility model.
Figure 2:
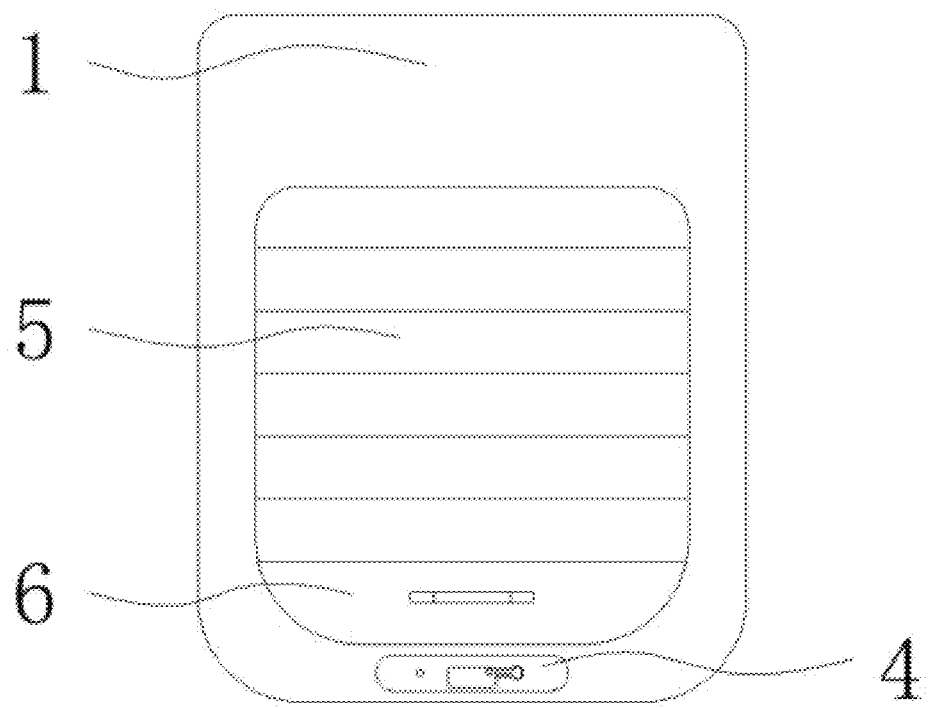
FIG. 2 is a schematic diagram of a main structure of the roller shutter-type intelligent garbage can head when a connecting blade is unfolded.
Figure 3:
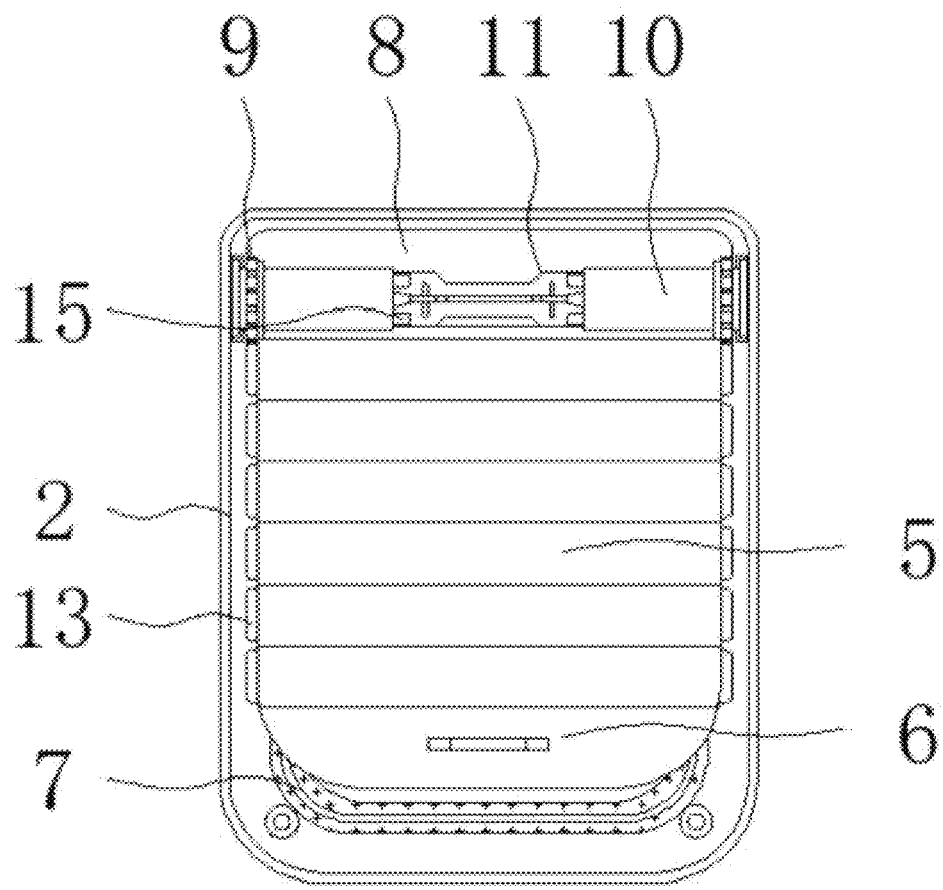
FIG. 3 is a cross-sectional view of a main structure of the roller shutter-type intelligent garbage can head when a connecting blade of the roller shutter-type intelligent garbage can head is unfolded.
Figure 4:
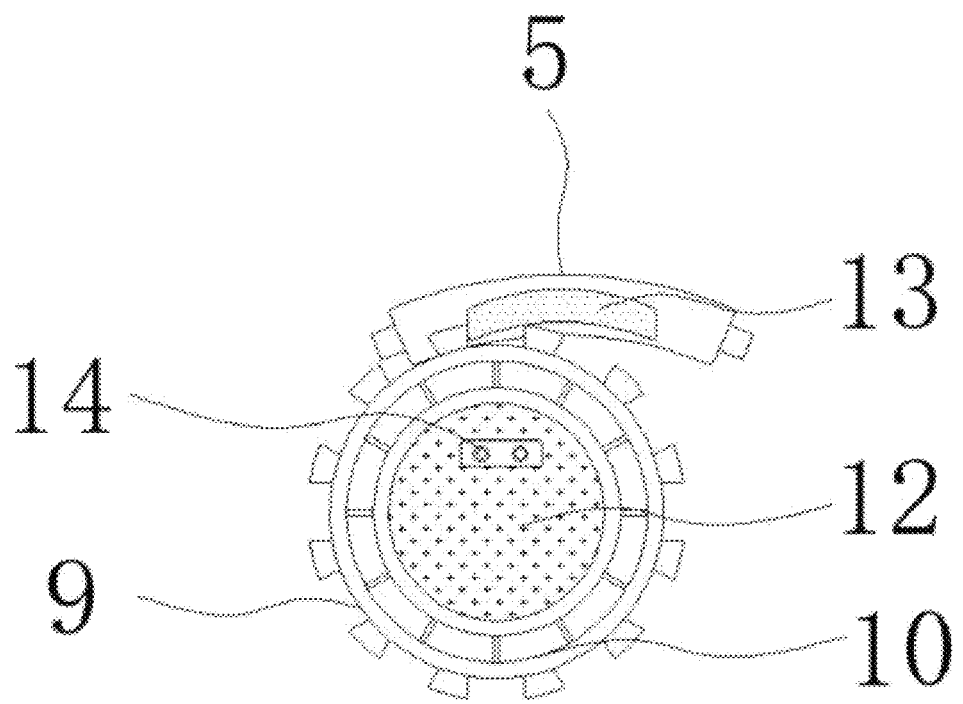
FIG. 4 is a schematic diagram of a side view structure of a connecting blade and a winding pipe transmission part of the roller shutter-type intelligent garbage can head according to the present utility model.

With reference to FIGS. 1 to 4, the present utility model provides the following technical solution: a roller shutter-type intelligent garbage can head, including a protective shell 1, a mounting shell 2, a sensor 4, connecting blades 5 and a coupler 11, where a sliding groove 3 is provided between the protective shell 1 and the mounting shell 2, the connecting blades 5 and a first baffle 6 are provided in the sliding groove 3 in a limited manner, a plurality of groups of the connecting blades 5 and the first baffle 6 are connected in a linked manner, an upper end of the mounting shell 2 performs limiting support on both sides of the bottom of the connecting blade 5 and the first baffle 6 via a support frame 7, and a rolling groove 8 is provided at a rear end of the mounting shell 2; a winding pipe 10 is mounted on both sides of the winding groove 8 in a limited manner, a rotating motor 12 is nested inside the winding pipe 10, the winding pipe 10 and the rotating motor 12 constitute a rotation structure, and the winding pipe 10 and the connecting blade 5 and the first baffle 6 constitute a winding structure via the rotating motor 12.

As a preferred embodiment of the present utility model, an interior of the protective shell 1 is positioned and mounted with the mounting shell 2 via a threaded hole position, so that the surface of the device is smooth and beautiful.

As a preferred embodiment of the present utility model, an outer side of the winding pipe 10 is in meshing connection with both the connecting blade 5 and the first baffle 6 via the limiting groove 9 and the limiting block 13.

As a preferred embodiment of the present utility model, a plurality of groups of clamping blocks 15 for engaging the coupler 11 are provided on the inner side of the winding pipe 10, the two groups of the winding pipe 10 constitute a synchronous transmission via the coupler 11, and the rotation of the two groups of the winding pipe 10 can be stably synchronized via the engagement and fixation of two ends of the coupler 11 with the winding pipe 10.

As a preferred embodiment of the present utility model, a front end of the protective shell 1 is provided with a sensor 4, the sensor 4 is electrically connected to the rotating electric motor 12 via a connecting line 14, and the start of the rotating electric motor 12 can be automatically controlled by automatic sensing at the upper end of the sensor 4.

The working principle is as follows: in a process of using the device, the roller shutter-type intelligent garbage can head should firstly be placed stably with the upper end of the garbage can body by mounting the shell 2, and the garbage can should be placed at the position required for use; when the device is used, the upper end of the garbage can head can be detected in real time by setting the sensor 4 at the front end of the protective shell 1, and the rear end of the sensor 4 is electrically connected to the rotating motor 12 via the control module connecting line 14; when a user passes the upper end of the sensor 4, the rotating motor 12 rotates; the winding pipe 10 can be driven to rotate stably, and the two groups of winding pipes 10 can be driven to rotate synchronously through the snap-fit connection between the coupler 11 on the inner side of the two groups of winding pipes 10 and the clamping block 15, and at this time, through the meshing connection between the limiting groove 9 on the outer side of the winding pipe 10 and the limiting block 13, the plurality of groups of connecting blades 5 and the first baffle 6 can be driven to slide stably in the protective shell 1 and the sliding groove 3 on the inner side of the mounting shell 2, and are synchronously wound in the winding groove 8 at the rear end of the mounting shell 2, so as to facilitate the use of a user, and improve the convenience and applicability of the device in use.

Having shown and described the basic principles and main features of the present utility model and the advantages of the present utility model, it will be apparent to those skilled in the art that the present utility model is not limited to the details of the above-described exemplary embodiments, and that the present utility model can be embodied in other specific forms without departing from the spirit or essential characteristics of the present utility model. The present embodiments are therefore to be considered in all respects as illustrative and not restrictive, the scope of the present utility model being indicated by the appended claims rather than by the foregoing description, and all changes which come within the meaning and range of equivalency of the claims are therefore intended to be embraced therein. Any reference sign in a claim should not be construed as limiting the claim concerned.

In addition, while the description has been described in terms of embodiments, not every embodiment includes a single embodiment, and that such recitation of the description is for purposes of clarity only and that those skilled in the art in the art will recognize that the description may be appropriately combined to form appreciated by a person skilled in the art.

The invention claimed is:

1. A roller shutter-type intelligent garbage can head, comprising:
    a protective shell;
    a mounting shell disposed on the protective shell;
    a sliding groove disposed between the protective shell and the mounting shell;
    a plurality of connecting blades disposed in the sliding groove;
    a first baffle disposed in the sliding groove and connected to the connecting blades;
    a support frame disposed on the mounting shell for supporting two sides of a bottom of each of the connecting blade and the first baffle;
    a winding groove disposed at a rear end of the mounting shell;
  a coupler disposed in the winding groove;
    two winding pipes disposed on two sides of the winding groove respectively;
  an electric motor disposed in one of the winding pipes;
    a first group of a plurality of clamping blocks fastened between one end of the coupler and an inner end of one winding pipe;
    a second group of a plurality of clamping blocks fastened between the other end of the coupler and an inner end of the other winding pipe; and
    a sensor disposed at a front end of the protective shell and electrically connected to the electric motor with a connecting line;
    wherein an outer end of each of the winding pipes is in meshing connection to both the first baffle and each of the connecting blades with one of a plurality of limiting grooves and one of a plurality of limiting blocks.

* * * * *